M. PEDERSEN.
VARIABLE SPEED GEARING.
APPLICATION FILED NOV. 8, 1913.

1,235,498.

Patented July 31, 1917.
4 SHEETS—SHEET 1.

M. PEDERSEN.
VARIABLE SPEED GEARING.
APPLICATION FILED NOV. 8, 1913.

1,235,498.

Patented July 31, 1917.
4 SHEETS—SHEET 2.

M. PEDERSEN.
VARIABLE SPEED GEARING.
APPLICATION FILED NOV. 8, 1913.

1,235,498.

Patented July 31, 1917.
4 SHEETS—SHEET 3.

M. PEDERSEN.
VARIABLE SPEED GEARING.
APPLICATION FILED NOV. 8, 1913.

1,235,498.

Patented July 31, 1917.
4 SHEETS—SHEET 4.

UNITED STATES PATENT OFFICE.

MIKAEL PEDERSEN, OF DURSLEY, ENGLAND.

VARIABLE-SPEED GEARING.

1,235,498.   Specification of Letters Patent.   Patented July 31, 1917.

Application filed November 8, 1913. Serial No. 799,967.

*To all whom it may concern:*

Be it known that I, MIKAEL PEDERSEN, a subject of the Kingdom of Denmark, residing at Raglan House, Dursley, in the county of Gloucester, England, have invented certain new and useful Improvements in Variable-Speed Gearing, of which the following is a specification.

My invention relates to gearing for different speeds, and has for its purpose to produce a gearing mechanism which is light, strong, durable, efficient, neat and cheap to manufacture, with a range of gears of different speeds changeable without sudden shocks, with facility for gradually "picking up" the power when changing into higher gears.

In my gear I employ "dog" or like positive clutches for locking the pinions or parts in a stationary condition in order to obtain the various gear ratios, but I incorporate friction clutches or braking elements and advantageously provide them in conjunction with the parts to which the pinions or members are positively locked, the object of the friction clutches or braking elements being to provide that although the pinions are positively locked, a gradual reception of the power by the gear is assured. By this arrangement I obtain great advantage both in operation and construction. I furthermore may incorporate a friction clutch or the equivalent in such a manner that if the power imparted to the gear should exceed a predetermined limit, the clutch or like device will come into operation and will "give" or "slip" in preference to imparting the power to or through the gear.

In carrying out the present invention the gear has a central spindle fixed in its support; the gearing proper carried in a shell or frame is revolving around on this central spindle or bearings arranged for the purpose.

The shell or frame holds one or more, preferably three, pinions each of which is composed of two or three concentric pinions of different sizes placed so as to gear into internal and external wheels or pinions concentric with the central spindle, one of which is the driving wheel meaning the wheel driving the planet pinions, and to which is transmitted the power from the motor or other source. One or more of the pinions is or are carried on the central spindle, so that they may at will, or automatically, be locked to the spindle or to the shell, or may run free always remaining in mesh, and one such central pinion may be locked by the aforementioned combined frictional and positive clutching arrangement, so as to be able to gradually pick up from a lower to a higher gear; the further frictional arrangement aforementioned may be used in order to prevent shock, when clutching the direct drive.

This gear may be arranged for two, three, or four or any suitable number of speeds, according to the number of wheels arranged to be locked to the central spindle.

In order that this invention may be clearly understood and readily carried into practice, reference may be had to the appended explanatory four sheets of drawings, upon which:—

Figure 1 is an elevation of a three-speed gear according to the present invention and adapted for application to the hub of a bicycle.

Fig. 1$^a$ is a detail view showing certain of the parts shown in Fig. 1.

Fig. 2 is an end elevation of the gear shown in Fig. 1, looking from the right.

In a convenient embodiment of the present invention and describing its application for use as a three speed gear, having the direct drive on the top gear, I form my driving wheel 1 with internally cut teeth. On or in relation to this wheel the driving pulley 2, chain wheel, or other driving arrangement is mounted so that said driving arrangement can revolve in relation to the internally cut wheel, when more driving power is applied than an adjustable friction arrangement 3 provided between the pulley 2 and wheel 1 will transmit.

Figures 1, 1A, 2:
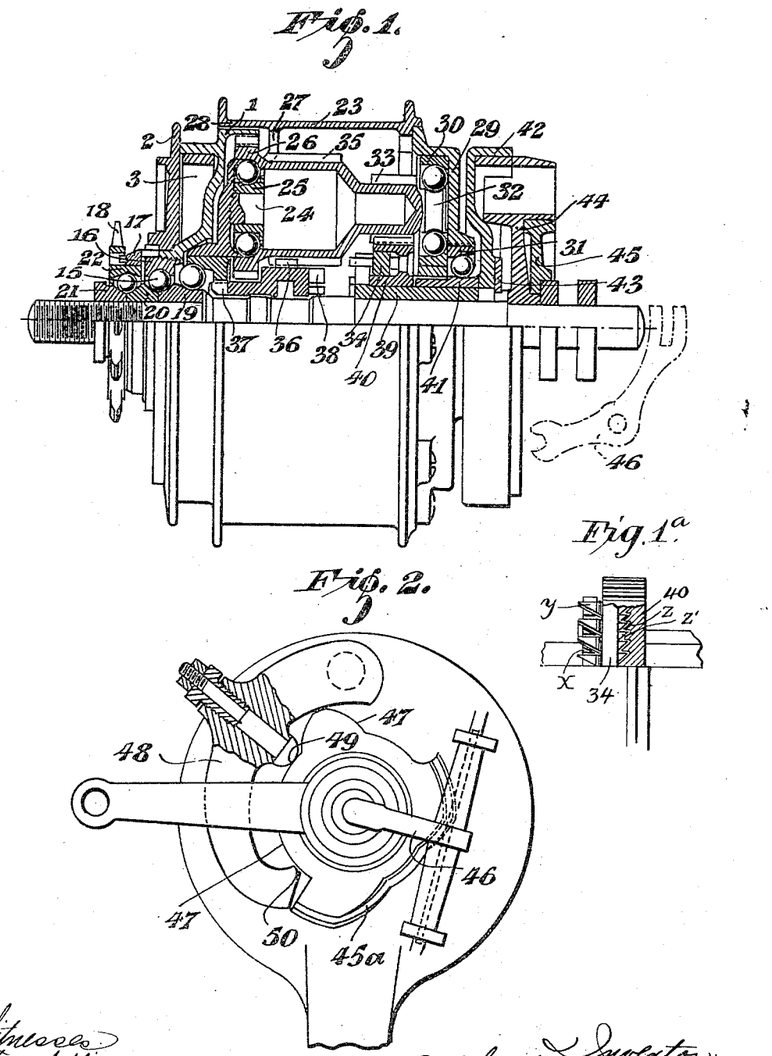
Figure 3:
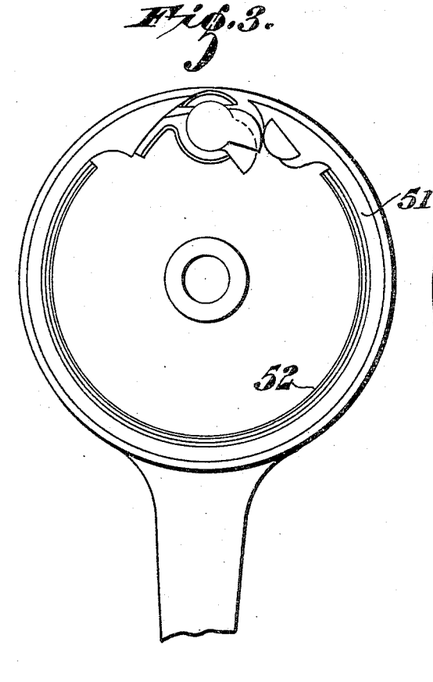
Fig. 3 is a view of the brake occurring at or near the right-hand side of Fig. 1, the aspect being from the left.
Figure 4:
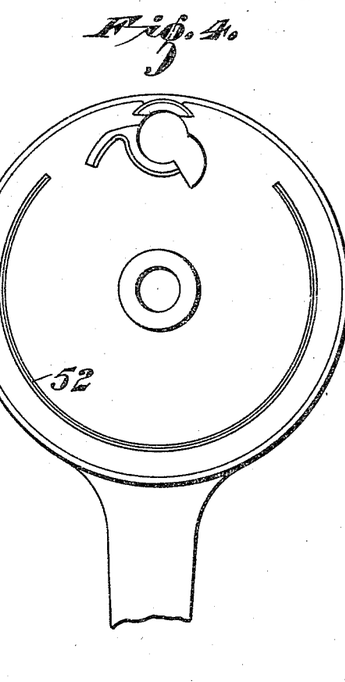
Fig. 4 is a similar view to Fig. 3 but with the brake band and operating part therefor removed.
Figure 5:
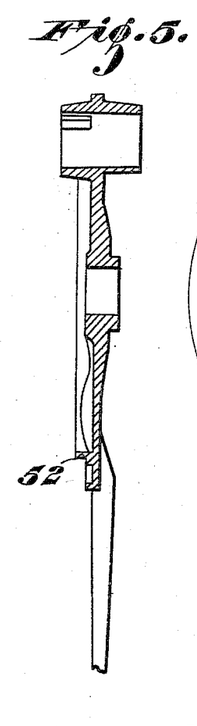
Fig. 5 is a sectional side elevation of the part shown in Fig. 4.
Figure 6:
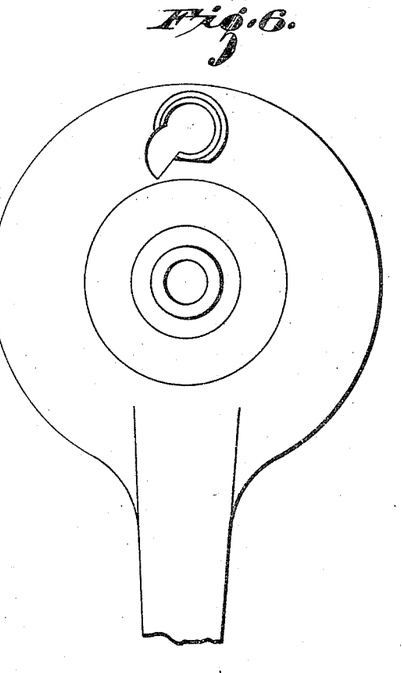
Fig. 6 is an elevation of the part shown in Figs. 4 and 5 and showing the latter as viewed from the right, (having regard to Fig. 1) instead of from the left.
Figure 7:
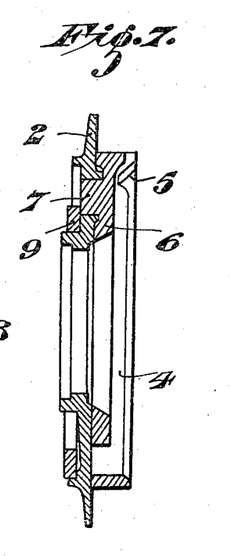
Fig. 7 is a section illustrating one form of clutch which may be used in connection with the main driving wheel.
Figure 8:
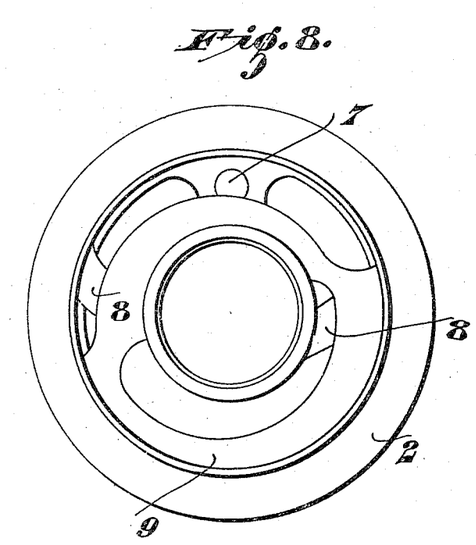
Fig. 8 is an illustration of the part shown in Fig. 7 as viewed from the left.
Figure 9:
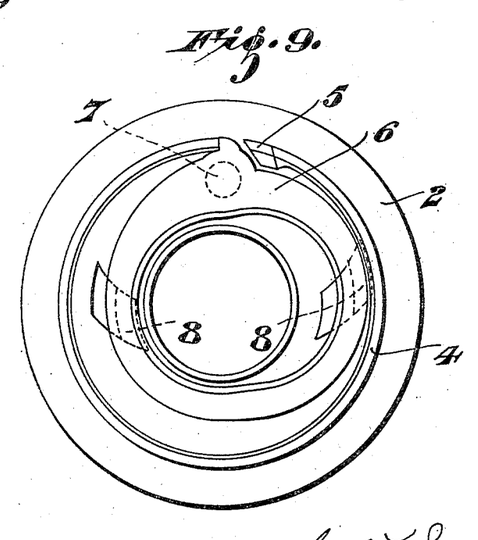
Fig. 9 is an illustration of the part shown in Fig. 7, but as viewed from the right.

One suitable friction clutch for use between the pulley or main driving member 2 and the internally toothed wheel 1 is shown in Figs. 7, 8 and 9, in which clutch an expanding split clutch ring 4 is mounted upon the pulley 2, one end of the ring 4, which may be beveled, being adapted to bear against the correspondingly beveled face of a projection 5 on the pulley 2, the other extremity of the ring 4 being engaged by a ring shaped lever 6 which is furnished with an integral projection 7 by which it is pivoted to the driving member 2. The ring-shaped lever 6 is also furnished with two further projections 8, 8 which pass through elongated slots in the member 2, and which projections 8 coöperate on the other side of the member 2 with a plate 9 shaped as shown in Fig. 8, the said plate 9 being rotatable for purposes of adjustment and being furnished with cam surfaces in such a manner that by the rotation of the plate 9, the ring-shaped lever 6 is displaced to expand the brake band 4. The plate 9 can be rotated by hand to any desired condition of adjustment, in which condition of adjustment it will remain without usually necessitating any locking or retaining means. The engaging faces of the projections 8, 8 may be beveled, by which arrangement the said projections 8, 8 may themselves be adapted to retain the plate 9 preventing its detachment from the driving member 2.

Figure 10:
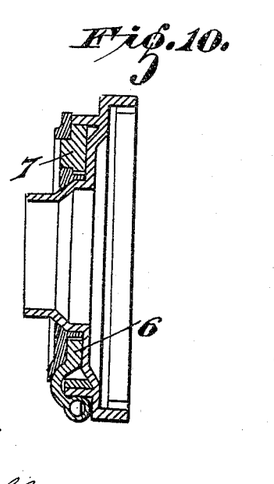
Fig. 10 is a section illustrating an alternative mechanism which may be adopted in lieu of the mechanism shown in Fig. 7.
Figure 11:
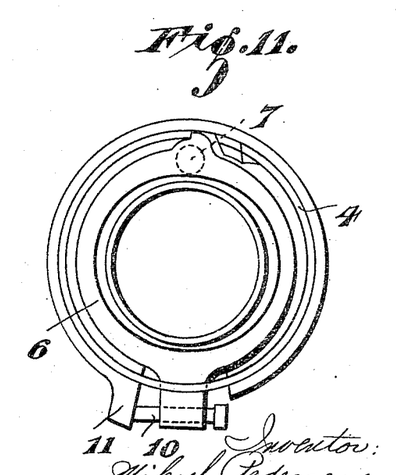
Fig. 11 is an illustration of the part shown in Fig. 10, as viewed from the right.

An alternative form of clutch for use between the driving member 2 and the internally toothed wheel 1, is shown in Figs. 10 and 11, in which alternative arrangement the ring-shaped lever 6 is adjusted by the employment of a screw 10 bearing against a projection 11 upon the driving member.

Figure 12:
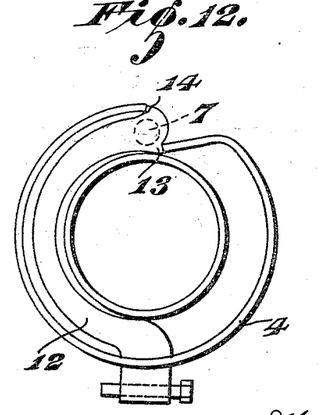
Fig. 12 is an illustration of an alternative mechanism which may be used in lieu of the mechanism shown in Figs. 10 and 11, the aspect of illustration being similar to that in the case of Fig. 11.

In the still further alternative arrangement shown in Fig. 12, the ring-shaped lever 6 is dispensed with in favor of a substantially semi-circular lever 12 adapted to engage with both ends of the expanding clutch ring 4 in such a manner that upon displacement of the lever 12, as for instance by a screw such as that described with reference to Fig. 11, the brake band is expanded from both of its ends by the engagement with such ends of shoulders 13 and 14 provided upon the lever 12.

To form the external seat for the ball bearing 15 for the above internally toothed wheel, a ring 16 forming a ball race is screwed into its center. In order to form part of a free wheel arrangement for starting or pedaling, this ring 16, has teeth cut around its circumference; a clutch ring 17 with a deeper and a shallower row of teeth pointing either way engages in these teeth and also in a corresponding row of teeth on a chain wheel 18 which in this case will do both for starting and for pedaling, or a pulley or other starting part. The central spindle at the driving end of the gear or hub carries the bearing or cone 19 for the main frame or shell, said cone being held against a shoulder on said spindle, this cone may also form one part of the bearing or cone for the driving internally cut wheel 1 above described, another cone 20 held against first named cone forming the other part. This cone may again have a plain seat for the starting device above named, but if the latter be a chain wheel 18 or other pedaling device, I form also here a double cone with another outside cone 21 for completing the said bearing, the chain wheel having a ball race 22 at its center, preferably V-shaped, so as to form a four point bearing. The outside cone 21 being threaded will hold the other cones in place. In cases in which only a plain bearing is used for starting device a screwed ring or nut may be employed, forming a shoulder which screwed ring or nut at the same time holds the cones in place.

The shell 23 or frame which has one bearing on the inner cone 19 already mentioned is in this end shaped to take the bearing or bearings for the planet wheels having for each such bearing a cylindrical projection or stud 24 around which the cone or inner race 25 is secured, the outer ball race having an annular depression to give better bearing and keep the balls running in a true line. For keeping the balls in place when the gear is disassembled a ring projection is provided on the shell end 27 and a shoulder is provided on the ring 25 at the other side of the balls thereby leaving between the said ring projection and shoulder a smaller opening outwardly than the size of balls. This race in an alternative arrangement may be integral with a stud projection through the web of the shell for its support. The planet wheel, having the biggest diameter at this end forms the outer race encircling the balls and is also formed with a shoulder for preventing endlong movement. The planet wheel 26 around this bearing gears into the driving internally cut wheel 1 for which purpose the end part 27 of the shell is carried back to allow room for the driving wheel to engage in the planet wheel which latter has its outer part projecting through the end web 27 of the shell for this purpose. The outer end 28 of the shell (and spoke flange thereon if used as a hub gear) encircles the internally cut driving wheel 1. The other or back end of the shell having the spoke flange has inwardly a machined seat in which an end plate 29 is concentrically fixed by bolts, screws, or other means. In this end plate are the seats for the outer ball races or cups 30 for the planet wheels (inwardly) and for the cup 31 of the main or central bearing (outwardly).

The ball race 32 on the planet wheels for this end constitutes the inner part of the bearing, the balls being advantageously retained in a suitable cage; the smallest pinion 33 is on this end, (this being the pinion for the low gear). Between this pinion 33 and the pinion 26 engaging the driving wheel 1, (the whole being one rigid part) is the pinion 35 for the medium speed. This has a wider peripheral face, as the central wheel 36 engaging with it slides on the spindle to clutch at either end or run free at a central position. The shell with its end plate thus form seats for the two main central bearings and also for the bearings for both ends of the double planet pinions. The ball race or cup fixed in the main frame or shell for the driving end of gears forms inwardly toward the center a dog clutch 37 which can at will be engaged by a corresponding dog clutch formed in the one end of the sun wheel or pinion 36 which can be slid endwise axially in any approved manner. On the other end of this sliding wheel 36 is another dog clutch 38 which clutches into another dog clutch formed on the inner end of a sleeve 39 seated around the central spindle. This clutch on the inner end of the sleeve 39 serves also as clutch for a free wheel clutch ring 34 axially sliding on a cylindrical seating provided in connection with the second sun or central wheel 40 which is for the lower gear and which engages the smallest end 33 of the planet pinions. The clutch ring 34 is seated in an annular recess in one side of the sun-gear 40 and serves to permit the said sun-gear to revolve freely in one direction whereas it may be locked by the ring 34 from movement in the opposite direction. For this purpose, the ring 34 has on one side small teeth $z$ which are adapted to mesh with the inclined teeth $z'$ upon the gear 40 and thus prevent movement of the gear in one direction while the inclination of the teeth $z$ and $z'$ is such as to permit the movement of the gear 40 in the other direction. On the other side from the teeth $z$, the ring 34 is provided with inclined teeth $y$ which engage the inclined teeth $x$ projecting upwardly from the end of the sleeves 39 so that the ring 34 cannot move angularly with respect to the sleeve. If now the gear 40 tends to revolve in one direction the inclined surfaces of the teeth $x$ and $y$ force the ring 34 to the right, firmly locking the teeth $z$ and $z'$ so that a tendency on the part of the gear 40 to revolve in the opposite direction will permit the ring 34 to slip somewhat to the left and thus release the teeth $z$ and $z'$. The purpose of this arrangement is to permit the gear 40 to follow the gear 33 when necessary. In cases in which the gear 35 is rolling on the gear 36, and the latter gear is locked, it is then necessary for the gear 40 to roll forward along with the gear 33 since the center of the gear 33 travels more rapidly in its planetary path than the gear teeth 33 roll upon the gear 40. The free wheel clutch ring may be the same type as that provided in connection with the starting element, that is to say a ring having large ratchet teeth engaging with teeth of the "dog" clutch and small ratchet teeth engaging with similar small teeth on the lower speed sun pinion 40 or vice versa, so that said small teeth can over-run each other. Mounted around the sleeve 39 is the cone 41 for the main bearing which cone also forms a distance piece to position the low speed sun wheel 40 against a shoulder or clutch teeth on the sleeve. The outer cylindrical end of the sleeve 39 is cut so as to form another clutch into which fits the center of a brake barrel 42 for the purpose of providing a permanent connection. The brake barrel forms a shoulder for the cone 41 and is itself held in place by a plate 43 locking in a circular groove on the outer end of the sleeve 39 the plate in assembling being secured by twisting. From the sleeve outward, is mounted on the spindle, and acting as shoulder for the sleeve, a fitting or frame 44 secured, from twisting, to the support holding the spindle by an anchor, ring, lever or other arrangement.

This fitting 44 has a seat on which a cam 45 can turn. This cam has a cam ridge $45^a$ which operates the one end of a double lever 46 pivoted on the fitting or frame named above; the other arm of the lever operates the outer end of the rod carrying the shoulder which engages with the sun pinion 36, the rod having a shoulder adapted to work in a forked end of the lever 46, or being in any other way suitably connected. The lever 46 may be adapted to displace the rod in both directions or only in one direction against the effort of a spring. Another face 47 on the cam 45 operates a second lever 48 pivoted in the frame or fitting on which the cam is mounted.

This lever may have two faces projecting toward the cam, one 49 for the medium gear (which may be adjustable) and the other 50 (which may not be adjustable, but which provides a greater leverage) for the low gear. The adjustable face 49 is two-sided, that is to say it is adapted to coöperate with two cam faces in such a manner that the brake may be operated for the medium gear by a movement of the cam in either direction. The brake is adapted to be disengaged during the operations of engaging the dog clutches, the brake being put into engagement after the dog clutches have properly engaged. This lever 48 is adapted by turning, to open a split ring 51 held in position upon a projection 52 on the innerside of the fitting carrying the lever so that the brake drum is expanded. The cam operation of the lever thus applies the brake which holds the brake drum 42 and by means of the sleeve 39 one of the inside central or sun wheels 36 or 40 gradually become stationary by virtue of the engagement of the dog clutch and of the free-wheel clutch, the dog clutch being engaged prior to the braking operation; the cam member shifts the sliding wheel into engagement with the brake drum sleeve and also applies the brake. By engaging the sliding wheel 36 with the cam sleeve the medium gear is obtained and by leaving the sliding wheel in a neutral position in which it spins freely between the two dog clutches, the low gear sun wheel 40 clutches by its free wheel clutch with the brake drum sleeve clutch giving low gear when the brake 51 is in operation but free engine or neutral when the brake is off. The other end of the sliding wheel 36 upon being clutched into the dog clutch in the center of the shell will lock the gearing thus making it solid and giving the direct drive.

The cam may operate the rod through a lever or by a direct actuation or in any suitable manner and the cam instead of being mounted concentrically may be mounted eccentrically in a manner which lends itself to the direct operation of the rod. Moreover instead of a rotating cam I may employ a sliding cam adapted to effect the desired operations either directly or through the medium of a lever or in any suitable way, the sliding cam being suitably mounted in a convenient support in the frame or fitting or in the mechanism.

Instead of either or both the split expanding brake rings described, contractile brake band or bands or any other suitable form of brake or clutch may be employed the lever and cam action being suitably modified. By leaving out the big sun wheel and the automatic ring clutch a two speed gear is obtained. For a four-speed gear I may employ an additional sun wheel having an automatic clutch and gearing with an additional train of planet pinions. In this arrangement two sun wheels are provided having automatic clutches enabling them to run free in one direction. One of these automatic clutches is furnished with means whereby it may be released to permit of the wheel running free in both directions.

It may in certain instances of a three speed hub be desirable to support the hub or shell at the driving end by a tube or equivalent member which extends inwardly to and forms a rigid part of the disk-like partition associated with the bearing at the other end so that the driving end of the hub is not borne directly but through the medium of this tube rigidly associated as it is with the disk which is secured within the shell. In such an arrangement the tube which is cut with holes to accommodate the gear wheels has advantageously at the driving end an inner ball bearing cone or member and the balls of the bearing engage with this and with an outer member which takes the form of a cup but which is secured to the spindle.

What I claim as my invention and desire to secure by Letters Patent is:—

1. A variable speed gear mechanism arranged on the epicyclic principle, and adapted to provide for a free running condition of the driving members, comprising in combination, a main driving member, one or more gear wheels, a main driven member, a stationary member, means for positively engaging and disengaging a gear wheel or gear wheels with or from said last mentioned member, a brake for said last mentioned member, said brake being adapted to be disengaged during the operation of positively engaging a gear wheel and having specific provision for so positioning the parts as to retain conditions of free driving member throughout the time during which it is desired that no movement shall be imparted to the main driven member.

2. A variable speed gear mechanism arranged on the epicyclic principle, comprising in combination, a sun-gear, a member adapted to be braked, means for braking said member, a positive clutch for engaging or releasing the sun gear with or from said member, and means providing two cam surfaces, one of which cam surfaces is adapted to engage and disengage the positive clutch, and the other of which cam surfaces is automatically adapted to operate the means for braking said member.

3. A variable speed gear mechanism comprising in combination two sun gears, positive clutch means for holding stationary one or the other of said gears including a brake, and means whereby said brake may be applied comprising a cam and a lever, said cam and lever being so arranged that the cam engages the lever at one radius when it is desired to retain one of the gear wheels from rotation, and at another radius when it is desired to retain another gear wheel from rotation.

4. A variable speed gear mechanism comprising in combination two sun gears, positive means for holding stationary one or the other of said gears including a brake, and means whereby said brake may be applied comprising a cam and a lever, said cam and lever being so arranged that the cam engages the lever at one radius when it is desired to retain one of the gear wheels from rotation, and at another radius when it is desired to retain another gear wheel from rotation, said lever having a projection or surface thereon arranged to engage with the operating portion of the cam, said projection or surface being adjustable and movable by displacement of the cam in either direction.

5. A variable speed gear mechanism comprising in combination two planet wheels of different diameters mounted coaxially and arranged to rotate as one piece, a frame for said planet wheels, an internally toothed ring engaging one of the planet wheels, an externally toothed sun wheel engaging another of the planet wheels, a member, means for braking and releasing said member, and clutch means whereby said sun wheel can be positively engaged by said frame or by said member.

6. A variable speed gear mechanism comprising in combination three planet wheels of different diameters mounted coaxially and arranged to rotate as one piece, a frame for said planet wheels, an internally toothed ring engaging one of the planet wheels, an externally toothed sun wheel engaging another one of the planet wheels, a member, means for braking and releasing said member, clutch means whereby said sun wheel can be positively engaged by said frame or by said member, said member having clutch teeth thereon, a sun pinion having automatic clutch preventing rotation thereof in one direction only, said sun pinion being retained on one side by the clutch teeth on the said member, a distance piece forming a bearing for said frame and retaining the sun pinion on its other side, a second member, a brake drum carried by said second member, said second member being arranged to retain said distance piece from axial displacement, and said second member being mounted in such relation to said sleeve as to be incapable of axial movement in relation to the same.

7. A variable speed gear mechanism comprising in combination three planet wheels of different diameters mounted coaxially and adapted to rotate as one piece, a frame or shell on which said planet wheels are mounted, an internally toothed ring engaging one of the planet pinions, an externally toothed slidable sun-wheel engaging another one of said planet pinions and having locking teeth, said sun-wheel having positive clutch means whereby it can be engaged with said shell or frame, a second sun-wheel having locking teeth, a ratchet ring provided with two sets of teeth one of which automatically engages the locking teeth on said second sun wheel when the ring revolves faster than the second sun-wheel in the direction of the normal rotation of said second sun wheel, a member adapted to be braked, and means for braking and releasing said member, said member having a single set of teeth which are adapted for engagement to said locking teeth on the first mentioned sun-wheel and also with other set of teeth on said ratchet ring.

8. A variable speed epicyclic gear mechanism comprising in combination a shell or frame, a planet member having two planet wheels adapted to rotate as one piece, a part rigid with said shell or frame, said shell or frame and said part rigid therewith having each an outer ball race and said planet members having an inner ball race formed at each end thereof for coöperating with said outer ball races, and balls mounted between said inner and outer ball races for supporting said planet members.

9. A variable speed epicyclic gear mechanism comprising in combination a shell or frame, a toothed wheel mounted substantially in external relation to the shell or frame, one or more planet members carried by said frame and each having two planet wheels thereon adapted to rotate as one, a part carried by said shell, said shell or frame and said part each having a portion of a ball race at each end of said planet members, and balls in said races for supporting said planet members, one of said planet wheels on each planet member being arranged to project through the shell or frame and to mesh with said toothed wheel.

10. A variable speed epicyclic gear mechanism comprising in combination a shell or frame, planet members mounted on said frame, and each having two planet wheels, the planet wheels of each member being adapted to rotate as one piece, a part rigid with said shell or frame, said shell or frame and said part each having a portion of a ball race at each end of said planet members, an externally toothed sun wheel arranged to mesh with one planet wheel of all the said planet members, positive clutch means for engaging said sun wheel with the shell or frame, a member adapted to be braked, and positive clutch means for engaging said sun wheel with said last mentioned member.

11. A variable speed epicyclic mechanism comprising in combination a shell or frame, one or more planet members each having two planet wheels, the planet wheels of each member being adapted to rotate as one piece, a part rigid with said shell or frame, said shell or frame and said part each having a portion of a ball race at each end of said planet members, a sun wheel adapted to mesh with one pinion of all the planet members, a member adapted to be braked, positive clutch means for engaging said sun wheel with the shell or frame on the one hand and said last mentioned member on the other hand, a second sun wheel mounted around said last mentioned member and arranged in mesh with the other pinions on said planet members, an automatic ratchet ring coöperating with said second sun wheel, said ring having teeth thereon for catching said wheel when said ratchet ring revolves faster than said second sun wheel in the direction of the normal rotation of said second sun wheel, said ratchet ring also having other teeth thereon, a distance piece forming a bearing for the main shell or frame and retaining said second sun wheel on one side, said last mentioned member having means retaining said ratchet ring and said second sun wheel on the other side, a member for retaining said distance piece from axial rotation, and a brake drum mounted on said retaining member, said last mentioned retaining member being mounted in such relation to said member adapted to be braked as to be incapable of axial movement in relation to the same.

12. An epicyclic variable speed gearing comprising in combination a driving member having an internally toothed wheel, a driven member, planet members carried upon the driven member each having two planet wheels, one of which planet wheels meshes with said internally toothed wheel, the said planet wheels of each member being of different diameters being coaxially arranged and adapted to rotate as one piece, a slidable sun gear in mesh with said planet wheels, and a stationary member with which said sun wheel may be engaged at will, the sun wheel throughout its movements remaining in mesh with the planet wheel.

13. An epicyclic variable speed gearing comprising in combination a driving member having an internally toothed wheel thereon, a driven member, planet members each having two wheels carried thereby, one of which meshes with said internal wheel, the said planet wheels being of different diameters and those on each planet member being mounted coaxially and adapted to rotate as one piece, a slidable sun wheel in mesh with one of the planet wheels in each planet member, and a stationary member with which said sun wheel may be engaged at will, the sun wheel being adapted also to engage with the driving member and to be placed in a neutral position in which it is disengaged from both the driving member and the stationary member, the arrangement being such that the sun wheel throughout all its movements for these positions is adapted to remain in mesh with the planet wheel.

14. An epicyclic variable speed gearing comprising in combination a driving member having an internally toothed wheel thereon, a driven member, one or more planet members each having two or more planet wheels thereon, one of the planet wheels of each member meshing with said internal wheel, the planet wheels of each planet member being of different diameters, being mounted coaxially and adapted to rotate as one piece, a slidable sun wheel arranged in mesh with one of the planet wheels of each planet member, a stationary member with which said sun wheel is adapted to engage, and a second sun wheel arranged to mesh with another wheel of the planet member, said second sun wheel having an automatic clutch by which when the sliding sun wheel is appropriately positioned, the second sun pinion is retained stationary to provide another speed, the arrangement being such that said sliding gear throughout its movements remains in mesh with its planet wheel and the second sun pinion is clutched to the stationary member only when the slidable sun wheel is appropriately placed.

15. A variable speed gearing mechanism comprising in combination concentric main driving and main driven members, and a safety device in the nature of a clutch adapted to provide for slipping or overrunning and arranged between the main driving and main driven members, said clutch being adapted to remain in the engaged position under all circumstances of working of the mechanism, means for changing the speeds and for providing the condition of free engine and other frictionally engageable means in addition to the safety device to provide for gradual picking up of the power from the conditions of free engine to the condition of drive.

16. A variable speed gearing mechanism comprising in combination a main driven member, an element mounted coaxially with said driven member, and variable speed transmitting means intermediate said element and said driven member, a gear wheel constituting the first member of said means, and a safety device incorporated between said element and said gear wheel, said safety device being mounted coaxially with said rivet element, said safety device constituting a clutch and having one part rigidly associated with the gear wheel and the other part rigidly associated with the said element.

17. A variable speed gearing mechanism comprising in combination concentric main driving and main driven members, a safety device between said driving and driven members in the nature of a clutch adapted to provide for slipping or overrunning means providing for changing the speeds between the driving and driven members and for providing a condition of free engine, said clutch being adapted to remain in the engaged position under all circumstances of working of the mechanism, and additional frictional means to provide for gradual picking up of the power from the condition of free engine to the condition of drive including a brake, and a member adapted to be engaged frictionally by said brake and retained in a stationary condition thereby, the arrangement being such that the condition of free engine is obtained by virtue of releasing said brake by the operator.

18. A variable speed gearing mechanism comprising in combination a shell, planet wheels carried by said shell, a sun wheel meshing with said planet wheels, a sleeve 39 having teeth thereon, clutch means whereby said sun wheel may be positively engaged with said shell on the one hand and with said teeth on the other hand, a second sun wheel 40, an automatic clutch 34 for providing for a free wheel in connection with said second sun wheel, said automatic clutch being also adapted to engage with the teeth on said sleeve, a bearing member 41 for retaining said second sun wheel 40 in its working position, a brake drum 42, a member integral with or carrying the brake drum for retaining said member 41 in position, said member having a permanent dog clutch connection with the sleeve 39, and a ring 43 or equivalent member for retaining said first mentioned member in such connection.

In witness whereof I have hereunto set my hand in the presence of two witnesses.

MIKAEL PEDERSEN.

Witnesses:
LEWIS D. GOOLD,
ARTHUR H. BROWN.